United States Patent
Ueda et al.

(10) Patent No.: US 12,211,227 B2
(45) Date of Patent: Jan. 28, 2025

(54) INFORMATION PROCESSING APPARATUS

(71) Applicant: NTT DOCOMO, INC., Chiyoda-ku (JP)

(72) Inventors: Kensuke Ueda, Chiyoda-ku (JP); Nobutaka Matsushima, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 368 days.

(21) Appl. No.: 17/776,153

(22) PCT Filed: Nov. 11, 2020

(86) PCT No.: PCT/JP2020/042075
§ 371 (c)(1),
(2) Date: May 11, 2022

(87) PCT Pub. No.: WO2021/095768
PCT Pub. Date: May 20, 2021

(65) Prior Publication Data
US 2022/0383534 A1    Dec. 1, 2022

(30) Foreign Application Priority Data

Nov. 15, 2019  (JP) .................................. 2019-206664

(51) Int. Cl.
*G06T 7/70* (2017.01)
*G06V 40/20* (2022.01)

(52) U.S. Cl.
CPC ................. *G06T 7/70* (2017.01); *G06V 40/20* (2022.01); *G06V 2201/07* (2022.01)

(58) Field of Classification Search
CPC ...... G06T 7/70; G06V 40/20; G06V 2201/07; G06V 20/52; G03B 21/00; G06F 3/01; G06F 3/0481
See application file for complete search history.

(56) References Cited

U.S. PATENT DOCUMENTS

| | | |
|---|---|---|
| 2009/0076920 A1 | 3/2009 | Feldman et al. |
| 2017/0161957 A1* | 6/2017 | Yajima ................... G06V 20/20 |
| 2018/0004282 A1* | 1/2018 | Aonuma ............... G06F 3/0487 |

FOREIGN PATENT DOCUMENTS

| | | |
|---|---|---|
| JP | 2008-152622 A | 7/2008 |
| JP | 2013-507696 A | 3/2013 |

(Continued)

OTHER PUBLICATIONS

International Search Report issued Dec. 15, 2020 in PCT/JP2020/042075 filed on Nov. 11, 2020, 2 pages.

(Continued)

*Primary Examiner* — Jianxun Yang
(74) *Attorney, Agent, or Firm* — Oblon, McClelland, Maier & Neustadt, L.L.P.

(57) ABSTRACT

An information processing apparatus includes a first detector configured to detect an object based on captured image information generated by an image capturing apparatus; a second detector configured to, in response to the object being detected by the first detector, detect a user operation carried out with regard to the object, the user operation involving a change in a state of the object; and a display controller configured to, in response to the user operation being detected by the second detector, generate an image that is associated with the object and the user operation, to display the generated image on a display apparatus.

10 Claims, 10 Drawing Sheets

(56) References Cited

FOREIGN PATENT DOCUMENTS

JP        2016-194762 A    11/2016
WO    WO 2018/150756 A1    8/2018

OTHER PUBLICATIONS

Office Action issued on Apr. 4, 2023 in the corresponding Japanese Patent Application No. 2021-556123 (with unedited computer-generated English Translation) therein, 8 pages.

* cited by examiner

DATABASE

| OBJECT | | USER OPERATION | IMAGE |
|---|---|---|---|
| CUP NOODLES |  | OPEN COVER POUR HOT WATER CLOSE COVER | TIMER |
| TEACUP |  | POUR HOT WATER PUT TEABAG IN | MUSIC PLAYER |
| | | ROTATE | TV |
| …… | …… | …… | …… |

INFORMATION PROCESSING APPARATUS

TECHNICAL FIELD

The present invention relates to an information processing apparatus.

BACKGROUND ART

An information processing apparatus is proposed in which when an object is placed on a tabletop or the like, displays an image of an operating panel or the like, corresponding to the object on the tabletop (see, for example, Patent Document 1).

RELATED ART DOCUMENT

Patent Document

Patent Document 1: Japanese Patent Application Laid-Open Publication No. 2016-194762

SUMMARY OF THE INVENTION

Problem to be Solved by the Invention

However, the technique described above has a problem in that when multiple objects are placed on a tabletop, multiple images, each corresponding to one of the objects, are displayed, and this prevents a user from easily viewing the images.

Means of Solving the Problem

To solve the above problem, an information processing apparatus according to one aspect of the present disclosure includes: a first detector configured to detect an object based on captured image information generated by an image capturing apparatus; a second detector configured to, in response to the object being detected by the first detector, detect a user operation carried out with regard to the object, the user operation involving a change in a state of the object; and a display controller configured to, in response to the user operation being detected by the second detector, generate an image that is associated with the object and the user operation, to display the generated image on a display apparatus.

With the information processing apparatus according to the above aspect, when a user operation involving a change in a state of an object is carried out with regard to the object, an image associated with the object and the user operation is displayed. In other words, no image is displayed unless a user carries out an operation involving a change in a state with regard to an object. Therefore, the problem of display of multiple images interfering with easy viewing of the images is overcome.

MODES FOR CARRYING OUT THE INVENTION

Modes for carrying out the present invention are explained below with reference to the drawings.

Outline of System

Figure 1:
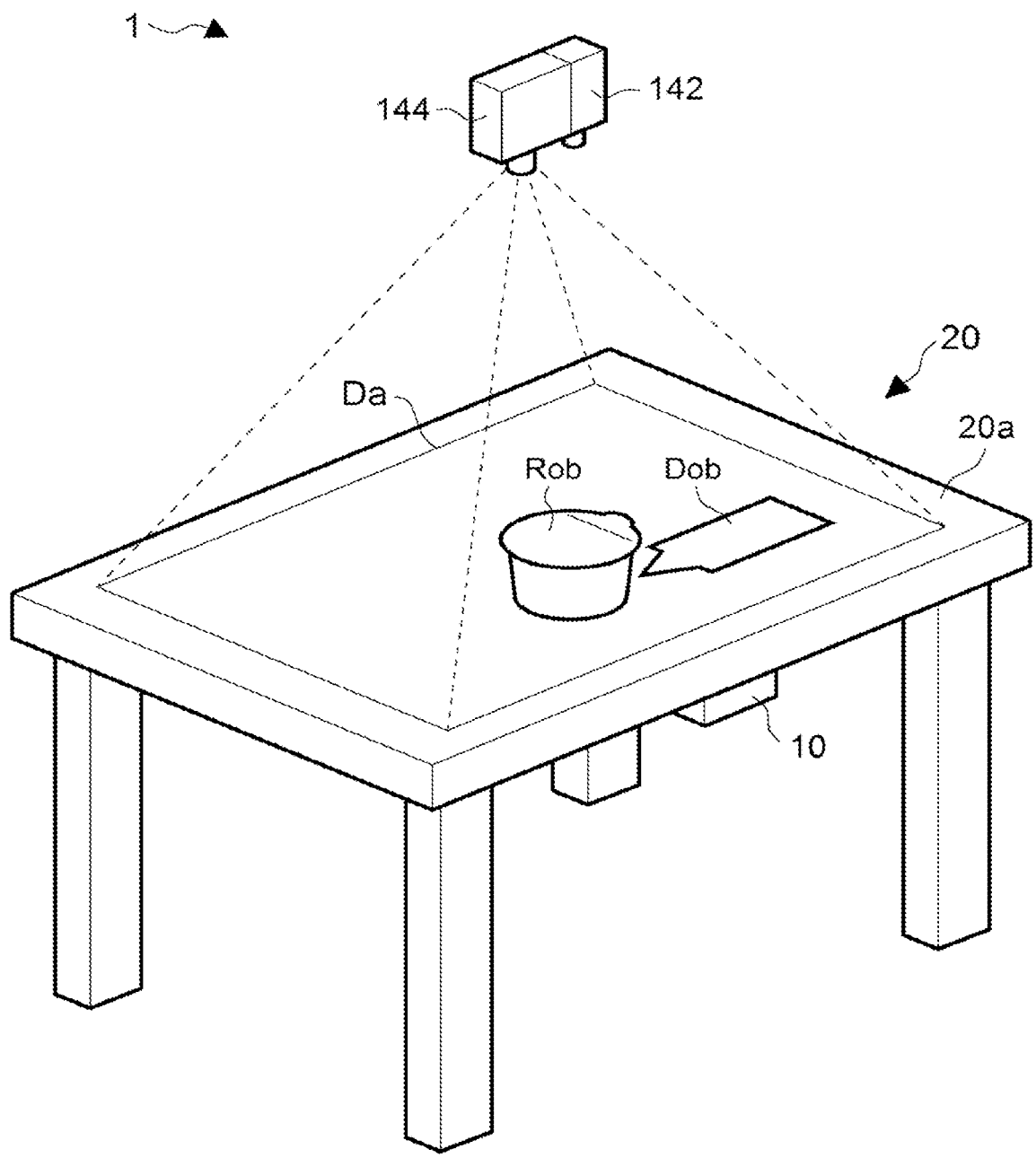
FIG. 1 is a diagram showing an outline of a system including an information processing apparatus according to a first embodiment.

FIG. 1 is a diagram showing an outline of a system 1 including an information processing apparatus 10 according to a first embodiment. As shown in FIG. 1, the system 1 includes the information processing apparatus 10, an image capturing apparatus 142, and a display apparatus 144.

The display apparatus 144 is a projector that projects video on a display area Da on a tabletop 20a of a table 20 with four legs, under the control of the information processing apparatus 10. In FIG. 1, the display apparatus 144 is attached to a ceiling and projects video from above. The image capturing apparatus 142 captures an image of the display area Da to generate captured image information and supplies the captured image information to the information processing apparatus 10. The information processing apparatus 10 is, for example, a computer attached to the table 20.

In FIG. 1, a cup of noodles is placed as an example of an object Rob on the tabletop 20a. In the system 1 in the present embodiment, when a user operation, which will be described later, is carried out with regard to the object Rob, the display apparatus 144 displays an image Dob at a location that is close to the object Rob and that does not overlap with the object Rob in a planar view.

Specifically, the image Dob is an image plane displayed by execution of an application program that is used in a timer, a television, a music playback apparatus, a video playback apparatus, or the like.

While the display apparatus 144 is configured to project video from above in the system 1, a configuration in which the tabletop 20a is made of frosted glass or the like to enable projection of video from below may be adopted. Although the image capturing apparatus 142 and the display apparatus 144 are separate components, the image capturing apparatus 142 and the display apparatus 144 may be integrally configured.

While the attachment location of the information processing apparatus 10 is the table 20 in the present embodiment, the information processing apparatus 10 may be attached above the table 20, similarly to the image capturing apparatus 142 and the display apparatus 144. Alternatively, the information processing apparatus 10 may be integrated with the image capturing apparatus 142 and the display apparatus 144.

The display apparatus 144 is not limited to the projector, and a configuration in which a display surface of a liquid crystal display apparatus, a plasma display, or the like is used as the tabletop 20a may be adopted.

First Embodiment

Figure 2:
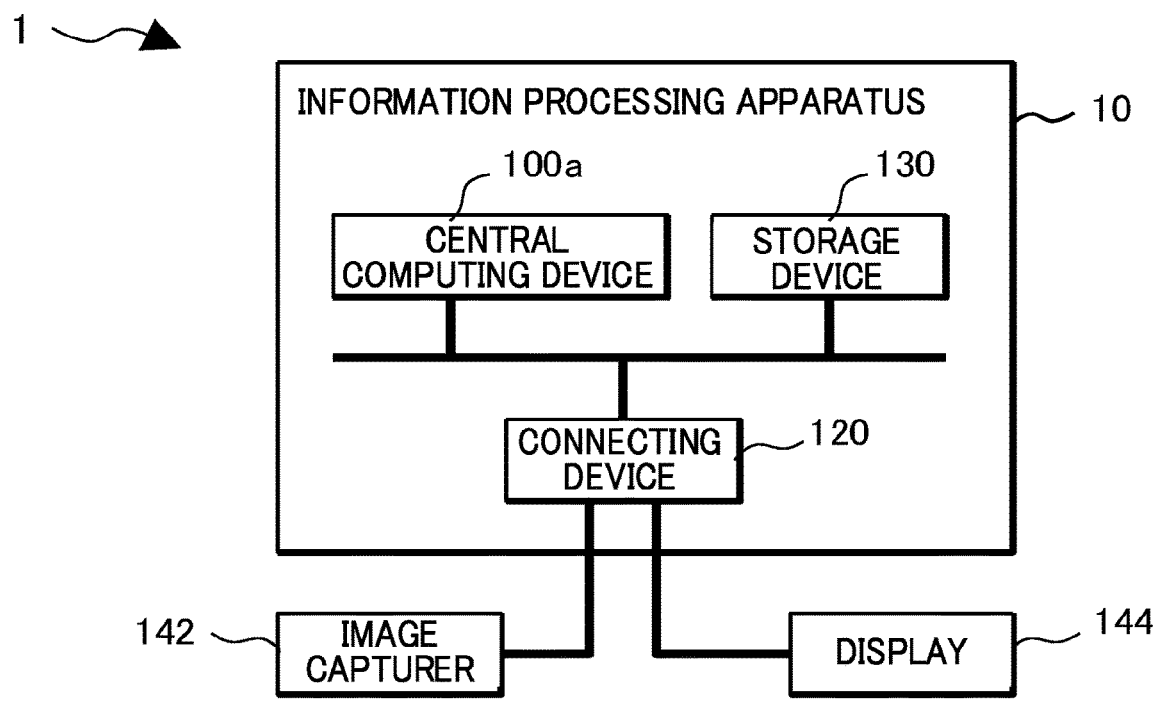
FIG. 2 is a diagram showing a hardware configuration of the information processing apparatus.

FIG. 2 is a block diagram showing a hardware configuration of the information processing apparatus 10 according to the first embodiment. The information processing apparatus 10 is realized by a computer including a central computing device 100a, a connecting device 120, and a storage device 130. The elements of the information processing apparatus 10 are mutually connected with a single bus or a plurality of buses.

The term "apparatus" may be understood in the same manner as other terms such as "circuit", "device", and "unit". Each of the elements of the information processing apparatus 10 is constituted of a single device or of a plurality of devices. Some of the elements of the information processing apparatus 10 may be omitted, or other elements, such as a communication apparatus for communication with other apparatuses via a network, may be added.

The central computing device 100a is a processor that controls the entire information processing apparatus 10 and is, for example, constituted of a single chip or a plurality of chips. The central computing device 100a is constituted of, for example, a CPU (Central Processing Unit) including an interface with peripheral apparatuses, an arithmetic unit, a register, and the like.

Some or all of the functions of the central computing device 100a may be realized by hardware such as a DSP (Digital Signal Processor), an ASIC (Application Specific Integrated Circuit), a PLD (Programmable Logic Device), and an FPGA (Field Programmable Gate Array). The central computing device 100a performs various types of processing in parallel or sequentially.

The storage device 130 is a recording medium that can be used by the central computing device 100a and has stored therein a plurality of programs to be executed by the central computing device 100a and various databases to be used by the central computing device 100a. The storage device 130 is constituted of one or more types of memory circuits such as a ROM (Read Only Memory), an EPROM (Erasable Programmable ROM), an EEPROM (Electrically Erasable Programmable ROM), and a RANI (Random Access Memory).

Examples of the programs to be executed by the central computing device 100a are a control program and a display application program. Among these, the control program is an OS (Operating System) that manages and controls the entire information processing apparatus 10 of a computer, or the like.

The display application program is a program for realizing a function for image recognition of the object Rob, a function to create the image Dob to display the image Dob on the display apparatus 144, and a function to recognize an operation carried out by the user with regard to the object Rob or the image Dob.

The databases stored in the storage device 130 and used by the central computing device 100a will be described later.

The image capturing apparatus 142 and the display apparatus 144 are connected to the connecting device 120. The captured image information is supplied from the image capturing apparatus 142 to the central computing device 100a through the connecting device 120, and display information required for display is output from the central computing device 100a to the display apparatus 144 through the connecting device 120.

Figure 3:
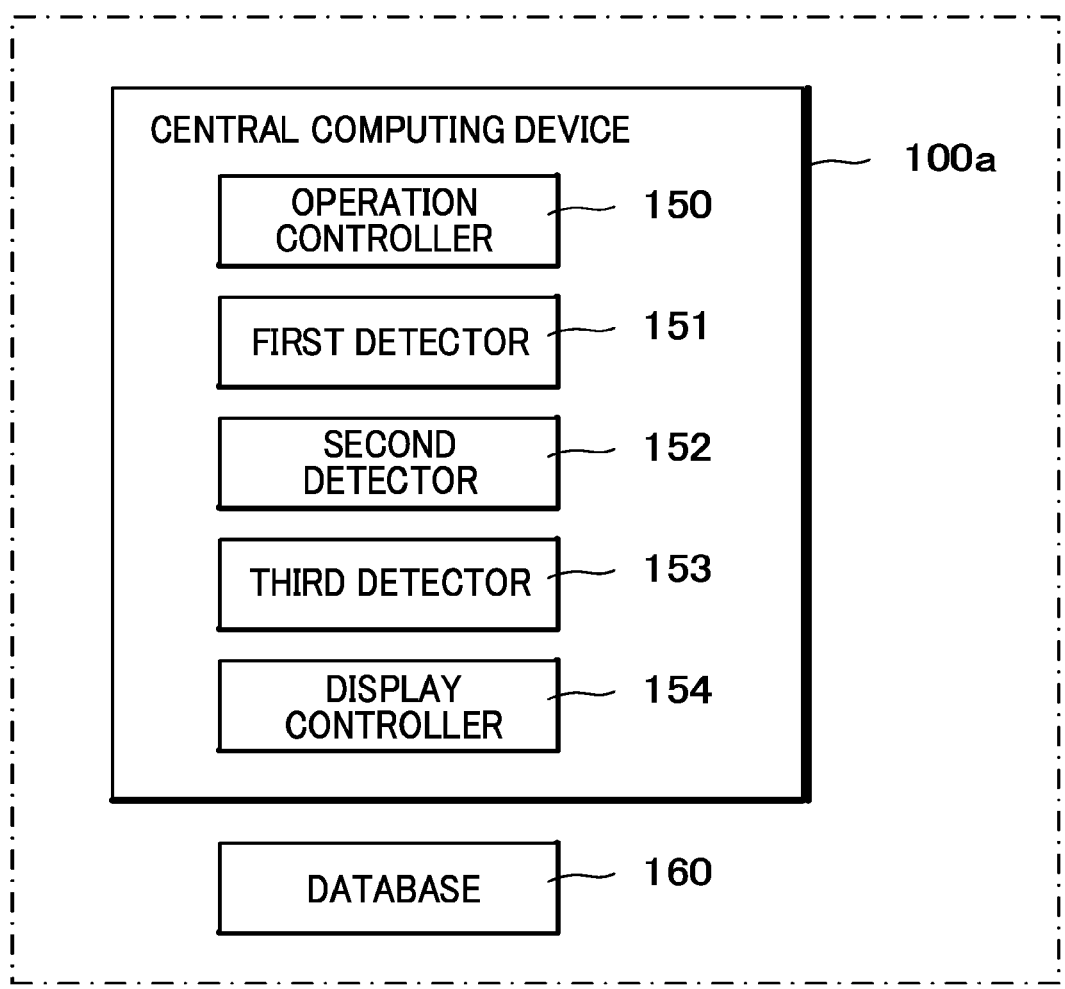
FIG. 3 is a block diagram showing an example of a function constructed in the information processing apparatus.

FIG. 3 is a diagram showing a functional configuration realized by the central computing device 100a executing the various programs stored in the storage device 130.

As shown in FIG. 3, an operation controller 150, a first detector 151, a second detector 152, a third detector 153, and a display controller 154 are constructed in the central computing device 100a.

The operation controller 150 controls operations of the first detector 151, the second detector 152, the third detector 153, and the display controller 154.

The first detector 151 detects an object Rob placed on the tabletop 20a by performing image processing on the captured image information. When the object Rob is detected by the first detector 151, the second detector 152 detects a user operation with regard to the object Rob, which involves a change in a state of the object Rob, by performing image processing on the captured image information.

When the object Rob is detected by the first detector 151 and the user operation involving a change in a state of the object Rob is detected by the second detector 152, the display controller 154 generates an image Dob that is associated with the object Rob and the user operation, to display the generated image Dob on the display apparatus 144.

The third detector 153 detects an action on the image Dob by the user, by performing image processing on the capture image information when the image Dob is displayed.

A database 160 is constructed in the storage device 130. Contents registered in the database 160 are explained next.

Figure 4:
FIG. 4 is an explanatory diagram of an example of a database of the information processing apparatus.
Figure 4:

FIG. 4 is a diagram showing an example of the contents registered in the database 160. As shown in FIG. 4, each of images Dob is associated with an object Rob and a user operation.

With respect to each of the objects registered in the database 160, an image pattern, which has been generated by capturing in advance an image of the object Rob placed on the tabletop 20a using the image capturing apparatus 142, is registered. The image pattern is a reference image that is a reference for a comparison.

When an object Rob is placed on the tabletop 20a, the orientation of the object Rob does not always match the orientation of the image pattern of the object registered in the database 160. Therefore, the first detector 151 determines whether the image of the object Rob captured by the image capturing apparatus 142 matches the image pattern of the object Rob registered in the database 160 while appropriately rotating the image of the object Rob.

In FIG. 4, the user operation is an operation with regard to an object Rob carried out by the user, and indicates a single operation or a combination of multiple operations involving a change in a state of the object Rob. The operation involving a change in a state indicates an operation that actually changes the state of the object Rob or a notice operation that will change the state of the object Rob in the future. Specifically, the change in a state includes changes in the orientation, the location, the shape, the condition, and the like of the object Rob.

The operation with regard to an object Rob carried out by the user includes an indirect operation on the object Rob as well as a direct operation on the object Rob. The indirect operation on the object Rob is an operation that produces a change in a state of the object Rob without direct contact with the object Rob by the user. For example, when an operation "pour hot water" is carried out in a case in which the object Rob is a teacup, the situation of the teacup changes without direct contact with the teacup by the user. Therefore, "pour hot water" is included in the indirect user operations.

The notice operation includes not only a direct operation with regard to the object Rob, but also an indirect notice operation that changes a state of the object Rob without direct contact with the object Rob by the user. For example, in a case in which the object Rob is "a cake" and an operation "hold a knife over" the cake is carried out, this operation can be considered as a notice of an operation of cutting the cake with the knife. Therefore, "hold a knife over" is an indirect notice operation among the user operations.

In detection of the user operation, an operation itself of the user may be detected, or the object Rob and a tool, "the cake" and "the knife" in the above example, may be detected.

In FIG. 4, an image of a timer is associated with a combination of three user operations "open the cover", "pour hot water", and "close the cover" for a cup of noodles being an object.

Figure 6:
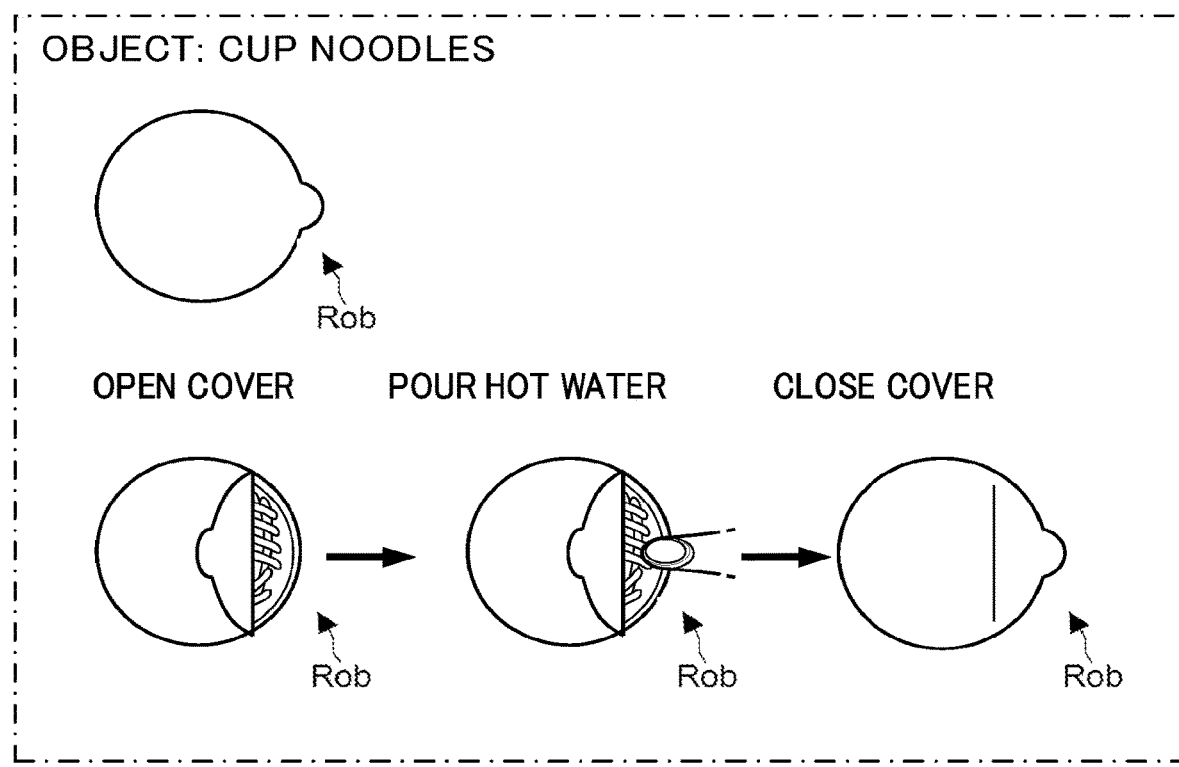
FIG. 6 is an example of a user operation involving a change in a state of an object.

The second detector 152 detects the operation "open the cover" among these user operations in a manner described below. For example, when the image of the object Rob changes into an image of a state in which about one third of the cover of the cup of noodles is opened upward as shown in FIG. 6, the second detector 152 detects occurrence of the user operation "open the cover".

When the image of "open the cover" changes into an image of a state in which the spout of a kettle or the like appears above the cup of noodles with the cover opened, the second detector 152 detects occurrence of the user operation "pour hot water".

Similarly, when the image of "pour hot water" changes into an image of a state in which the cover of the cup of noodles is closed, the second detector 152 detects occurrence of the user operation "close the cover".

The user operation may be detected by various methods other than this method.

An image of "a music player" is associated with a combination of two user operations "pour hot water" and "put a teabag in", and an image of "a television" is associated with a single user operation "rotate", as examples for a teacup being the object Rob.

The image Dob of a timer among the images Dob is explained with reference to FIG. 7.

The image Dob of a timer is displayed when a user operation associated with the object Rob (see FIG. 4) is carried out.

Figure 7:
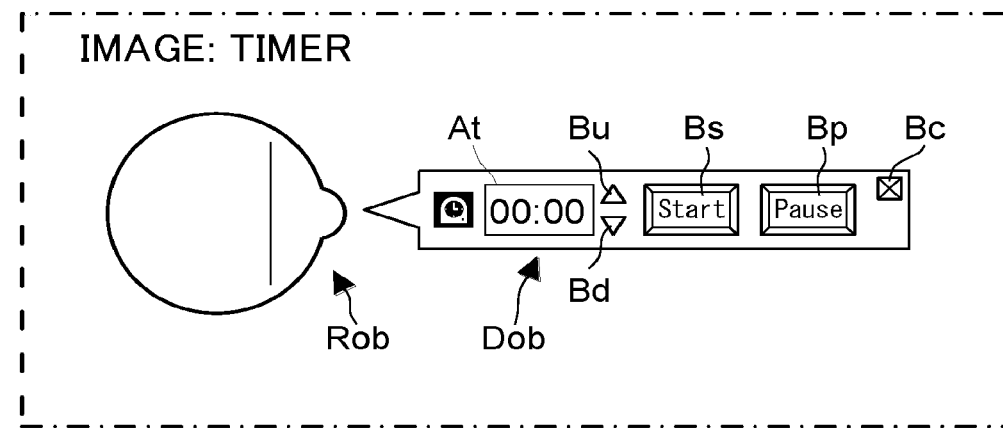
FIG. 7 is a diagram showing an example of an image obtained by the information processing apparatus.

For example, an area At indicating the amount of time, a button Bu for increasing the amount of time, a button Bd for decreasing the amount of time, a button Bs for instructing start of counting down of the timer, a button Bp for instructing a pause of counting down of the timer, and a button Bc for instructing erasing of the image Dob are provided in the image Dob of the timer, as shown in FIG. 7.

As shown in FIG. 7, display in the initial state in the area At is "00:00", that is, 0 minutes and 0 seconds. The initial state is a state immediately after this image Dob is displayed. The initial state in the first embodiment has a fixed value irrelevant to a history of past operations.

Figure 8:
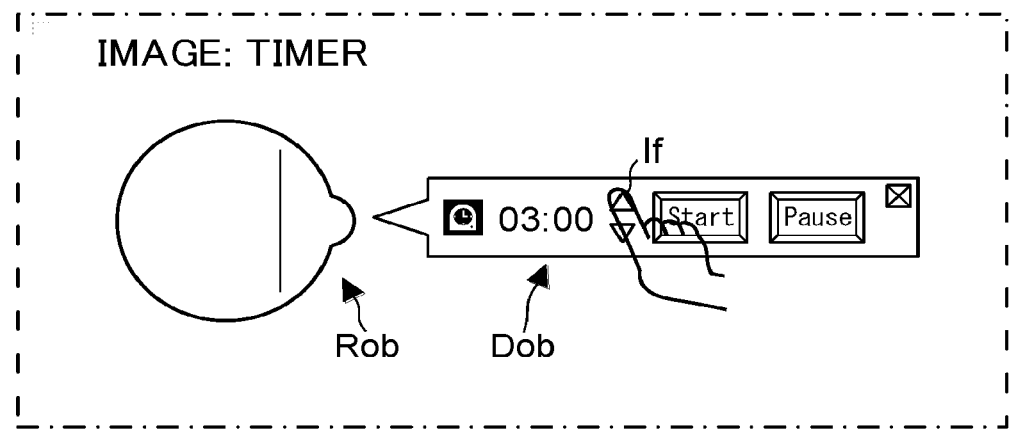
FIG. 8 is a diagram showing an example of an action on an image.

As shown in FIG. 8, when the user touches the button Bu with a tip If of an index finger in the image Dob of the timer, the amount of time in the area A1 of the image Dob is increased, for example, in one-minute increments.

Since the image Dob is projected on the tabletop 20a by the display apparatus 144, the image Dob is nonmaterial, unlike the object Rob. Therefore, the user acts as if manipulating a virtual operator included in the image Dob. Accordingly, in the present explanations, manipulating a virtual operator included in the image Dob by the user is expressed as providing an action on the image Dob. The virtual operator corresponds to, for example, the buttons Bu, Bd, Bs, Bp, and Bc.

When the amount of time has reached a desired value in the course of which the amount of time in the area A1 is increased in one-minute increments by the user touching the button Bu with the tip If of the index finger, the user lifts the index finger off the button Bu. This enables the user to set a desired amount of time in the timer. For example, when the user lifts the index finger off the button Bu at a time when the amount of time in the area A1 has reached "03:00", that is, three minutes, as shown in FIG. 8, the time is set to three minutes. When the user places a finger over the button Bs after the time amount is set, the timer starts counting down the remaining amount of time.

In practice, the third detector 153 detects an action on the image Dob, and the display controller 154 generates an image Dob changing in response to the detected action to display the generated image Dob on the display apparatus 144.

The timer on the image Dob is not limited to that shown in FIG. 8 and various forms such as display of a sandglass or display of an analog indicator are assumed. Any of the forms is configured to be capable of changing the desired remaining amount of time from the initial state in response to an action on the image Dob.

As the image Dob, various things, such as a television and a music player, are assumed, in addition to the timer. Although not shown, when the image Dob is a music player, the image in the initial state indicates a first one of the music files stored as a playback target in a predetermined folder, and a state in which the volume level is zero. The music file as the playback target and/or the volume level can be changed by performing an action on the image Dob. When the image Dob is a television, the image in the initial state indicates the channel at the end of the last use as a viewing target, and a state in which the volume level is zero. The channel as the viewing target and the volume level can be changed by performing an action on the image Dob.

In the present embodiment, the display apparatus 144 projects the image Dob on the tabletop 20a from above. Therefore, when the user performs an action on the image Dob using a hand, the image Dob overlaps with the hand of the user in a captured image indicated by the captured image information as shown in FIG. 8. Therefore, an image portion to be recognized by the third detector 153 is complicated, and the likelihood that the third detector 153 cannot accurately detect the action on the image Dob is increased.

Figure 9:
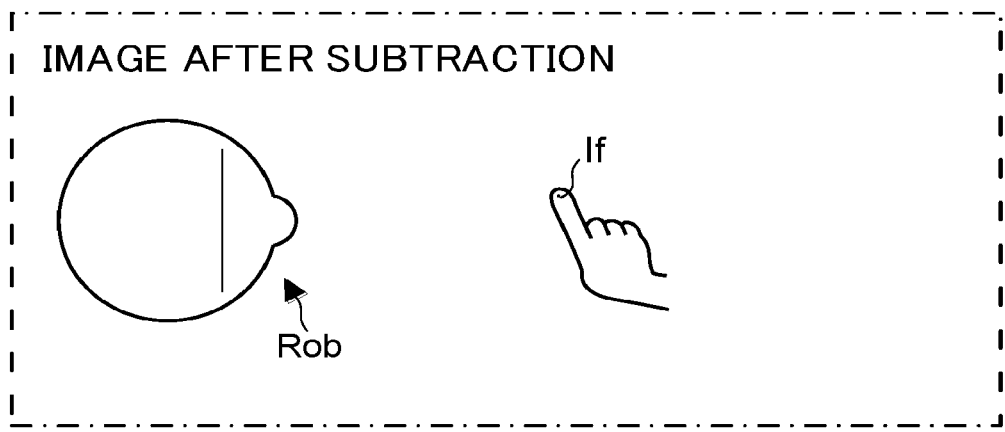
FIG. 9 is a diagram showing an example of an image detected by a third detector.

In the present embodiment, the image Dob itself is created by the display controller 154. Accordingly, in a case in which the image Dob is displayed on the tabletop 20a, the third detector 153 acquires the display information of the image Dob from the display controller 154 and subtracts the information of the image Dob from the captured image information supplied by the image capturing apparatus 142. An image indicated by the subtracted captured image information is as shown in FIG. 9. Since the image Dob is erased as shown in FIG. 9, the location of the hand of the user, particularly the tip If of the index finger, can be accurately detected.

In addition, the locations of the buttons and the like in the image Dob are known based on the display information of the image Dob acquired from the display controller 154.

Therefore, when the image Dob is displayed, the third detector 153 compares the location of the hand of the user obtained by subtracting the display information of the image Dob from the captured image information, with the locations of the buttons and the like obtained based on the display information of the image Dob, thereby enabling accurate detection of a part in the displayed image Dob on which the user has carried out an action.

Operation in First Embodiment

Figure 5:
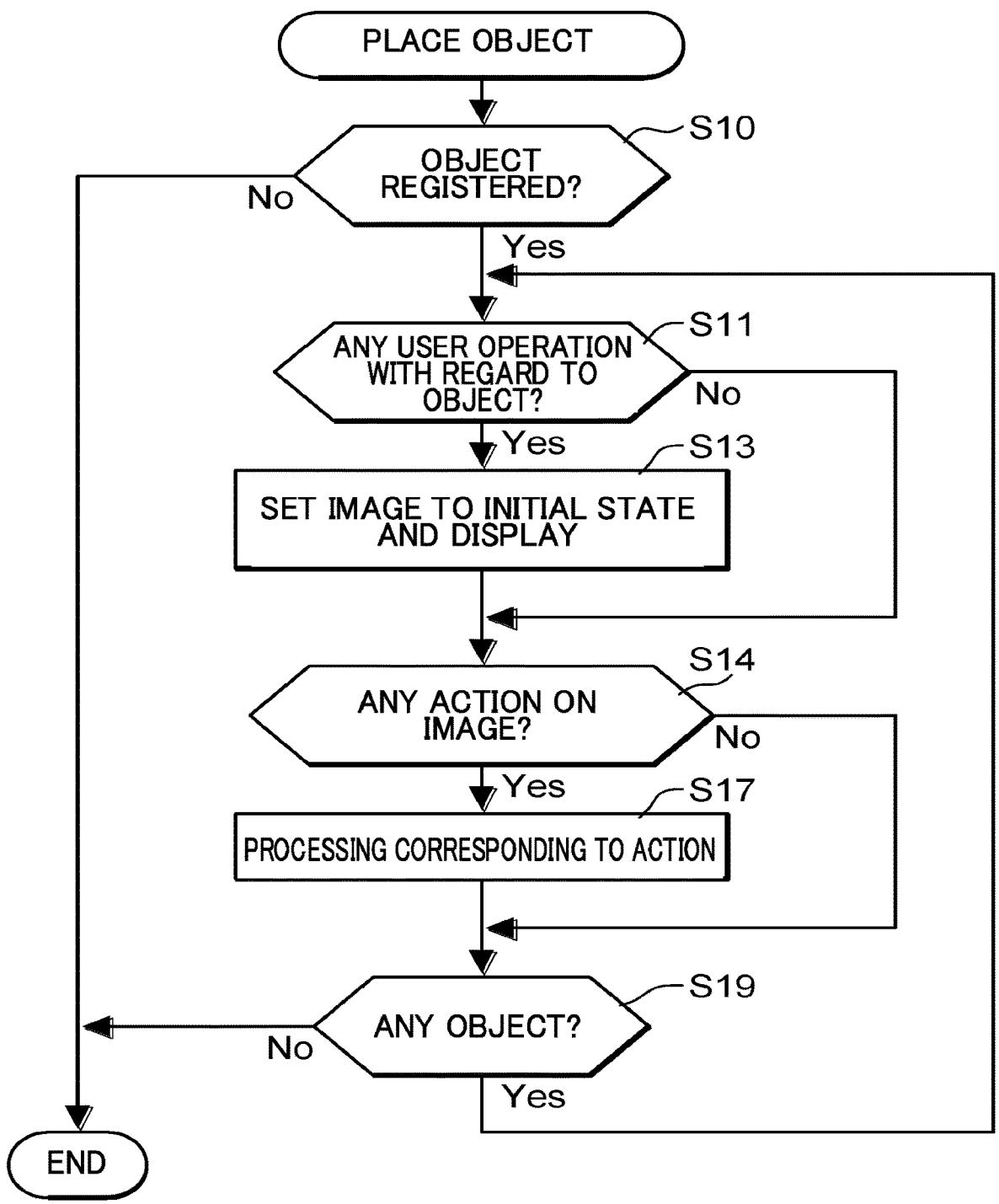
FIG. 5 is a flowchart showing an example of an operation of the information processing apparatus.

FIG. 5 is a flowchart showing an operation of the central computing device 100a of the information processing apparatus 10 according to the first embodiment.

This operation is performed with the central computing device 100a functioning as the first detector 151 upon detect of an object Rob as a trigger.

In other words, this operation is not performed unless an object Rob is detected. Hereinafter, the operation of the central computing device 100a is explained as operations of the functional blocks.

First, the operation controller 150 determines whether an object Rob detected by the first detector 151 has been registered in the database 160 (Step S10).

When it is determined that the detected object Rob has not been registered in the database 160 (when the determination result at Step S10 is "NO"), the operation controller 150 ends this operation.

On the other hand, when it is determined that the detected object Rob has been registered in the database 160 (when the determination result at Step S10 is "YES"), the operation controller 150 determines whether a user operation associated with the object Rob has occurred based on the result of the detection by the second detector 152 (Step S11). There is a case in which a combination of user operations is associated with the object Rob, and the operation controller 150 determines in this case whether all of the user operations have been carried out.

When it is determined that the user operation associated with the object Rob has not occurred (when the determination result at Step S11 is "NO"), the operation controller 150 causes the processing procedure to proceed to Step S14.

On the other hand, when it is determined that the user operation associated with the object Rob has occurred (when the determination result at Step S11 is "YES"), the operation controller 150 instructs the display controller 154 to display an image Dob, described below, on the display apparatus 144. That is, in response to the instruction, the display controller 154 sets the image Dob associated with the user operation to the initial state and displays the image Dob on the display apparatus 144 (Step S13).

Next, when the determination result at Step S11 is "NO" or when the processing at Step S13 ends, the operation controller 150 determines whether the user has provided an action on the image Dob based on the detection result of the third detector 153 (Step S14).

When it is determined that the user has provided an action on the image Dob (when the determination result at Step S14 is "YES"), the operation controller 150 performs processing corresponding to the action (Step S17).

For example, when an action occurs on any of the buttons Bu, Bd, Bs, Bp, and Bc in a case in which the image Dob is a timer, the operation controller 150 instructs the display controller 154 to generate an image Dob corresponding to the action. In response to this instruction, the display controller 154 generates the image Dob and outputs display information of the generated image Dob to the display apparatus 144. Accordingly, the display apparatus 144 displays the image Dob on the tabletop 20a.

When the determination result at Step S14 is "NO" or when the processing at Step S17 ends, the operation controller 150 determines whether the object Rob is on the tabletop 20a based on the detection result of the first detector 151 (Step S19).

When it is determined that the object Rob is on the tabletop 20a (when the determination result at Step S19 is "YES"), the operation controller 150 returns the processing procedure to Step S11. Accordingly, the operation controller 150 determines whether a user operation on the object Rob has occurred again and performs processing corresponding to the determination result.

On the other hand, when it is determined that the object Rob is not on the tabletop 20a (when the determination result at Step S17 is "NO"), the operation controller 150 ends this operation. With the end of the operation, the display of the image Dob also ends. A situation in which the object Rob is not on the tabletop 20a is produced, for example, by the user putting away the object Rob that has been on the tabletop 20a.

When the object Rob is placed again on the tabletop 20a, the first detector 151 detects the object Rob and the operation controller 150 accordingly performs again the operation shown in FIG. 5.

In the first embodiment, when a user operation with regard to an object Rob, which involves a change in a state of the object Rob, is carried out, an image Dob associated with the user operation is displayed. In other words, even when many objects Rob are placed on the tabletop 20a, no image Dob is displayed unless a user operation involving a change in a state of the objects Rob is carried out. Therefore, according to the first embodiment, the problem of the images Dob becoming difficult to see or causing confusion due to display of many images Dob, is solved.

Second Embodiment

The image Dob is displayed as a fixed value in the first embodiment. The image Dob is also a music player or a television as well as a timer, and it is bothersome for the user to change the image Dob from the fixed value to a desired value immediately after the image Dob is displayed. The information processing apparatus 10 according to a second embodiment is different from the information processing apparatus 10 according to the first embodiment in that the initial state is set in the image Dob based on a past history.

The system 1 in the second embodiment is different from the system 1 in the first embodiment in that the central computing device 100a is replaced with a central computing device 100b and in that some of the operation is changed. Accordingly, differences between these systems 1 are mainly explained in the second embodiment.

Figure 10:
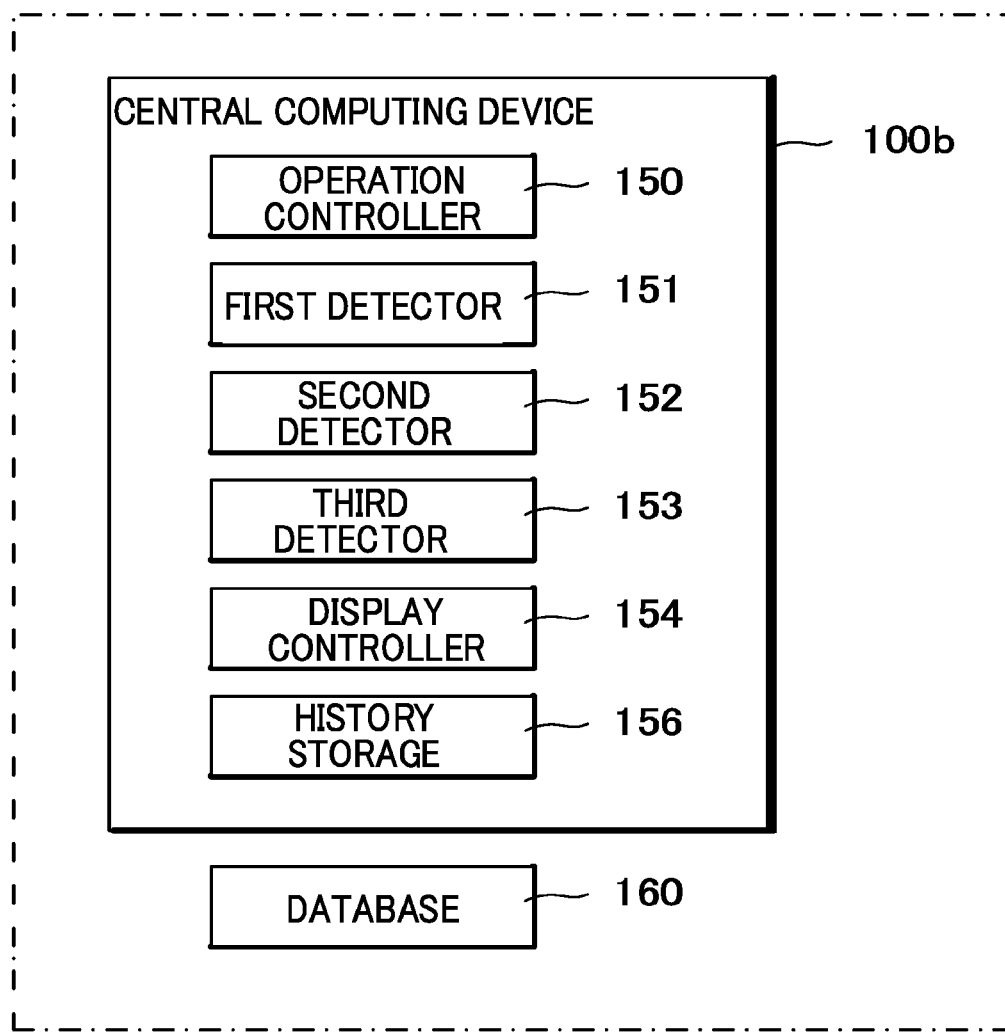
FIG. 10 is a block diagram showing an example of a function constructed in an information processing apparatus according to a second embodiment.

FIG. 10 is a diagram showing a functional configuration realized in the central computing device 100b.

As shown in FIG. 10, a history storage 156 is constructed in addition to the operation controller 150, the first detector 151, the second detector 152, the third detector 153, and the display controller 154 in the central computing device 100b.

The central computing device 100b includes a non-volatile memory. The history storage 156 is a part of the non-volatile memory. The history storage 156 may be a part of the storage device 130.

Initial states of each of images Dob are stored in the history storage 156 as a history.

Operation in Second Embodiment

Figure 11:
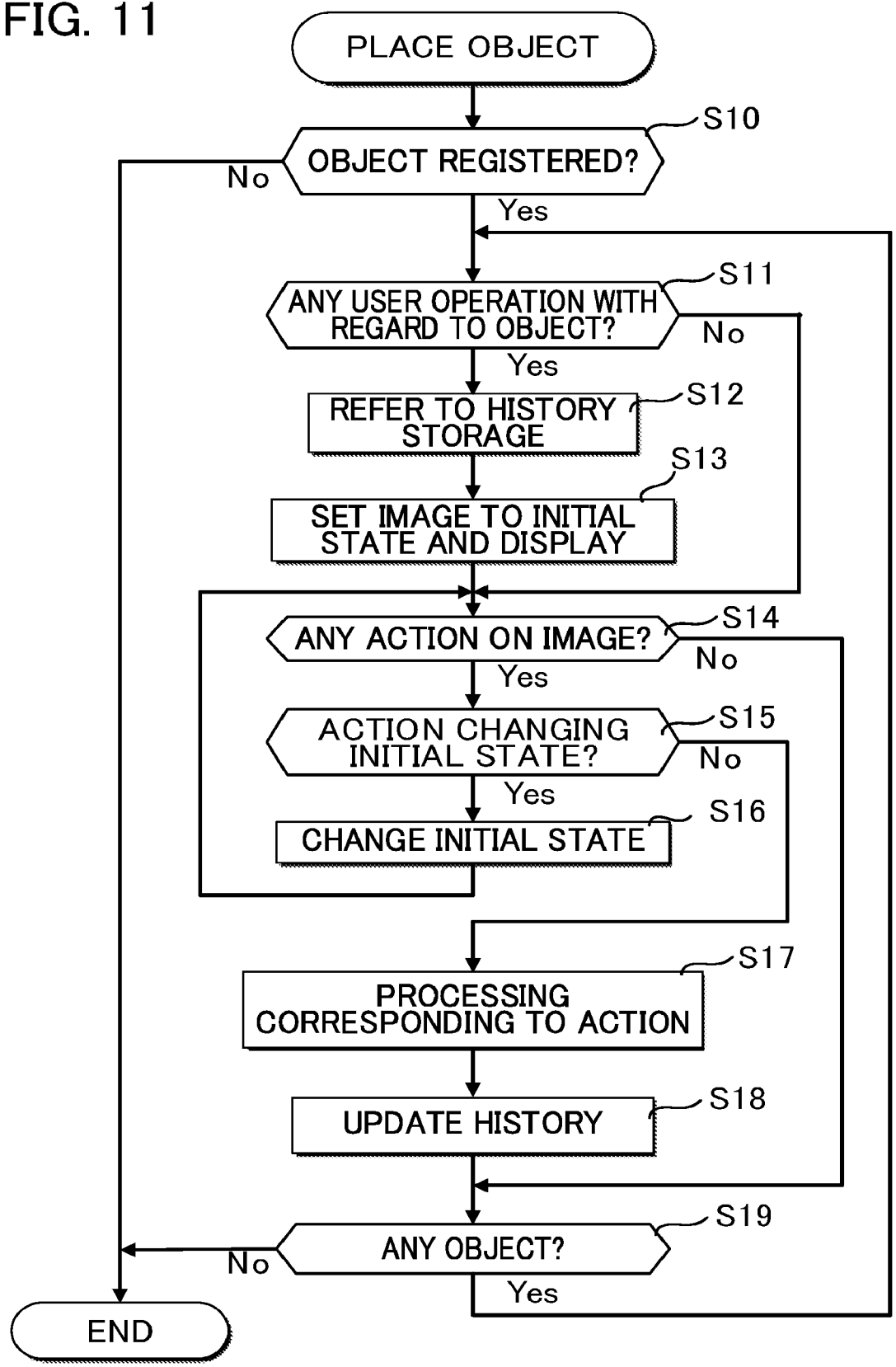
FIG. 11 is a flowchart showing an example of an operation of the information processing apparatus.

FIG. 11 is a flowchart showing an operation in the information processing apparatus 10 according to the second embodiment. The flowchart shown in FIG. 11 includes additional processing at Steps S12, S15, S16, and S18 when compared to FIG. 5.

In FIG. 11, when it is determined that a user operation associated with the object Rob has occurred (when the determination result at Step S11 is "YES"), the operation controller 150 refers to the history storage 156 and acquires the history of initial states of the image Dob associated with the user operation (Step S12).

The operation controller 150 having acquired the history instructs the display controller 154 to display an image Dob described below on the display apparatus 144 (Step S13). Specifically, the operation controller 150 sets the image Dob to an initial state that is highest in number (that is, the most frequent) among the initial states included in the acquired history, and instructs the display controller 154 to display the image Dob on the display apparatus 144. For example, when the image Dob is a timer, display of the initial state in the area At is "00:00", that is, 0 minutes and 0 seconds, as described above. When an initial state in which the setting time in the area At is "03:00" and is the highest in number among the initial states included in the history stored in the history storage 156, an image Dob of the initial state in which the setting time in the area At is "03:00" is displayed on the display apparatus 144.

Instead of being set to the initial state that is the highest in number, the image Dob may be set to an average initial state (for example, an average value of the setting times of the timer) in the history of the initial states, may be set to the most recent initial state, or may be set to an initial state having the highest value among values that are respectively obtained by performing a weighting operation on the initial states.

In the second embodiment, when it is determined that the user has provided an action on the image Dob (when the determination result at Step S14 is "YES"), the operation controller 150 determines whether this action is an action changing the initial state (Step S15). The action changing the initial state is an action changing the initial state immediately after the image Dob is displayed and is, for example, an action performed on the button Bu or Bd in a case in which the image Dob is a timer.

When it is determined that the action performed on the image Dob is an action changing the initial state (when the determination result at Step S15 is "YES"), the operation controller 150 changes the initial state in response to this action (Step S16) and returns the processing procedure to Step S14.

An action being a target of the processing at Step S16 is an action changing the initial state. An example of the action changing the initial state is an action on the button Bu or Bd in a case in which the image Dob is a timer. The setting time displayed in the area At is changed in response to this action.

On the other hand, when it is determined that the action on the image Dob is not an action changing the initial state (when the determination result at Step S15 is "NO"), the operation controller 150 performs processing corresponding to this action (Step S17).

In the second embodiment, actions being the target of the processing at Step S17 are actions other than actions changing the initial state. For example, in a case in which the image Dob is a timer, the target actions are actions other than those performed on the buttons Bu and Bd. Accordingly, processing corresponding to an action performed on any of the buttons Bs, Bp, and Be is performed at Step S17.

In the second embodiment, after the processing at Step S17, the operation controller 150 stores the initial state of the image Dob in the history storage 156 (Step S18). For example, in a case in which the image Dob is a timer, the operation controller 1150 adds the setting time changed in response to the action on the button Bu or Bd to the history.

In the second embodiment, the processing at Step S18 is sometimes performed without passing through Step S16. That is, the processing at Step S18 is sometimes performed with the initial state displayed at Step S13 unchanged. In this case, the unchanged initial state (that is, the initial state displayed at Step S13) is added to the history at Step S18. Therefore, the initial state added to the history at Step S118 includes an initial state in a case in which the initial state of the image Dob displayed at Step S13 is changed in response to an action by the user (S13→S14I:YES→S15: YES→S16→S14:YES→S15:NO→S17→S18) and an initial state in a case in which the initial state is maintained with no change (S13→S14:YES→S15:NO→S17→S18).

The initial state displayed at Step S13 is an initial state that is set referring to the history storage 156. Therefore, there is a case in which the image Dob of the initial state in which the setting time in the area At is "03:00" among the initial states included in the history stored in the history storage 156 is displayed on the display apparatus 144 at Step S13 as in the example described above. When the setting time is not changed thereafter in response to an action by the user, the initial state in which the setting time is "03:00" is added to the history at Step S18 as the initial state in a case including no change. In this way, the history of initial states stored in the history storage 156 reflects a tendency of initial states selected by the user in the past.

According to the second embodiment, the changed initial state is sometimes reflected in the initial state at the next display of the image Dob. In this case, the user can be spared the effort of changing the initial state to a desired state. Furthermore, since the changed history (that is, the tendency of initial states selected by the user in the past) is reflected in the initial state at the next display of the image Dob according to the second embodiment, the likelihood for the user of changing the initial state for the next time can be reduced.

Applications and Other Matters

The following applications or modifications can be made in the embodiments described above and the like.

While being a location not overlapping the object Rob in a planar view in the embodiments and the like, the display location of the image Dob may be a location overlapping with the object Rob in a planar view depending on the type of the object Rob and the like. For example, in a case in which the object Rob is "a cake" described above and a user operation with regard to the cake is "hold a knife over", cutting lines for equally dividing the cake into pieces corresponding to the number of seated persons may be displayed as the image Dob to be overlapped on the cake.

The database 160 and the history storage 156 may be provided in an external server instead of the information processing apparatus 10. In a case of being provided in an external server, the database 160 and the history storage 156 may be shared by a plurality of information processing apparatuses 10.

When the information processing apparatuses 10 share the history storage 156, a mode of generating a model by learning the history of initial states of a certain image Dob in association with attributes of a user, such as age, sex, height, and weight, may be adopted. When a user operation is carried out with regard to a certain object Rob in a certain information processing apparatus 10 in this mode, the external server identifies the initial state of the image Dob for the user operation according to the model by inputting an attribute of the user who has carried out the user operation and the type of the object Rob into the model. The external server then provides the identified initial state of the image Dob to the information processing apparatus 10. The operation controller 150 of the information processing apparatus 10 sets the initial state of the image Dob to the initial state of the image Dob provided by the external server. According to this mode, the image Dob can be set to an initial state suitable for the user who has carried out the user operation based on the trained model that reflects a tendency of initial states selected by users having different attributes.

In the first embodiment, the operation shown in FIG. 5 or FIG. 11 is performed with detection of an object Rob by the first detector 151 as a trigger, and the operation ends when the object Rob is not detected. That is, the object Rob is an object placed by a user or a movable object in the embodiment.

The object Rob is not limited thereto and may be an object that is fixedly placed or that does not move. For example, in a case in which the tabletop 20a is replaced with a desktop in an office, the object Rob may be a telephone. In this case, when a user operation such as pressing an on-hook button or lifting a receiver is carried out with regard to the telephone, an image Dob of a telephone directory or the like may be displayed.

While the configuration in which the image Dob is projected on the tabletop 20a by the display apparatus 144, such as a projector, is adopted in the first embodiment, the system 1 is not limited to this configuration.

Figure 12:
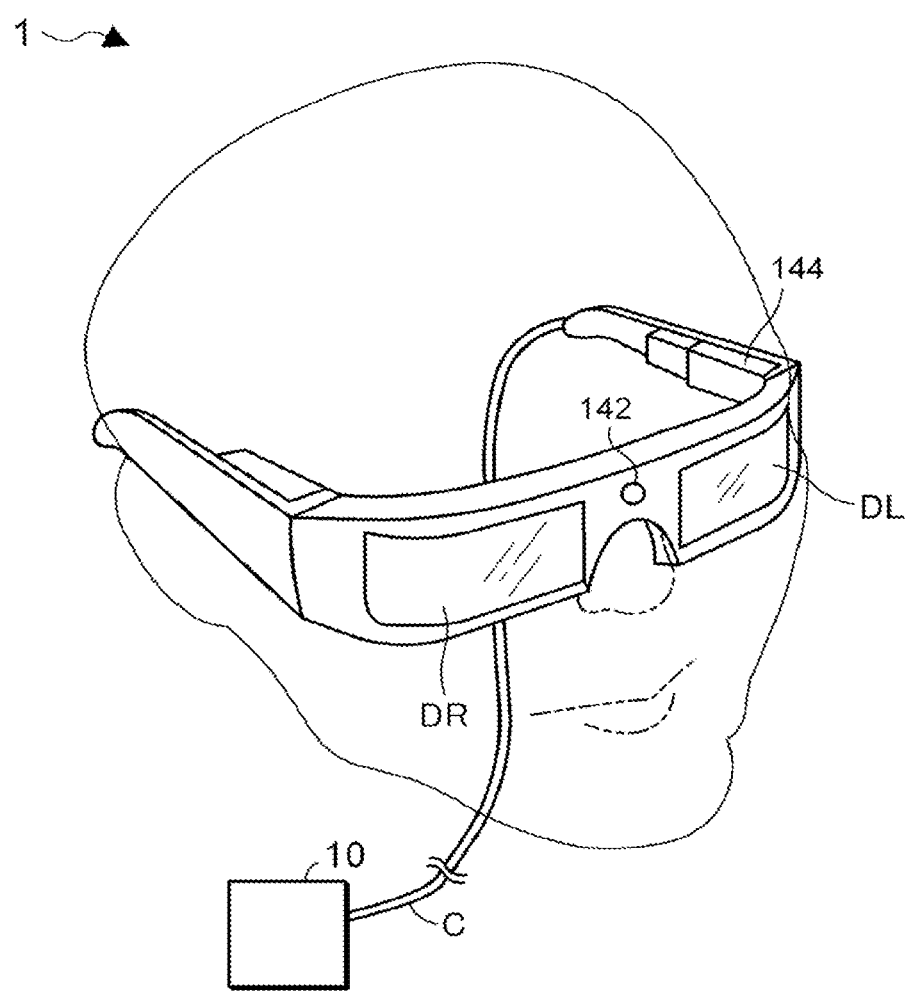
FIG. 12 is a diagram showing another example of the information processing apparatus.

FIG. 12 is a diagram showing the system 1 including the information processing apparatus 10 according to an application example. The system 1 shown in FIG. 12 includes a head-mounted display 140 and the information processing apparatus 10. The head-mounted display 140 is of a so-called optical see-through type. Specifically, parts corresponding to the lenses of eyeglasses in the head-mounted display 140 are semitransparent mirrors DL and DR. The display apparatus 144 projects an image Dob on the semitransparent mirror DL based on the display information supplied from the information processing apparatus 10 via a cable C.

The image capturing apparatus 142 is provided on the front surface of the head-mounted display 140. The captured image information from the image capturing apparatus 142 is supplied to the information processing apparatus 10 via the cable C, so that the object Rob, a user operation, and an action by a user are detected based on the captured image information.

Therefore, a user fitted with the head-mounted display 140 experiences the image Dob as being a sort of virtual reality while visually recognizing a real environment.

The head-mounted display 140 may display the image Dob to correspond to both eyes or may be of a so-called video see-through type that displays the image Dob so as to be overlapped on video captured by the image capturing apparatus 142.

Other Matters

In the exemplarily flowcharts shown, the order of the steps may be changed. In other words, the order of the processes in the preferred aspects of the present invention is not limited to the specific order.

The functions exemplarily shown in FIG. 3 or FIG. 10 are implemented by a freely chosen combination of hardware and software. The functions may be implemented by a single device or may be implemented by two or more devices that are configured as separate devices from each other.

The program should be broadly interpreted so as to refer to an instruction, an instruction set, a code, a code segment, program code, a sub program, a software module, an application, a software application, a software package, a routine, a subroutine, an object, an executable file, an execution thread, a procedure, a function or the like, whether the program is called software, firmware, middleware, microcode, or a hardware description language, or is called something else.

The software, the instructions, and the like may be transmitted and received through a transmission medium. For example, when the software is transmitted from a website, a server or another remote source using a wired technology such as a coaxial cable, an optical fiber cable, a twisted pair, and a digital subscriber line (DSL) and/or a wireless technology such as an infrared, radio waves, and microwaves, these wired technologies and/or the wireless technologies are included within the definition of the transmission medium.

The aspects and embodiments described herein are applicable to systems utilizing long term evolution (LTE), LTE-advanced (LTE-A), SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMax), IEEE 802.20, Ultra-WideBand (UWB), Bluetooth (registered trademark) and other proper systems and/or next generation systems extended based on thereon.

The information or the like that has been input or output may be saved in a specific location (such as a memory) or may be managed in a management table. The information or the like that is input or output may be overwritten, updated, or additionally written. The information or the like that has been output may be deleted. The information or the like that has been input may be transmitted to another device.

The determination may be performed in accordance with a value (0 or 1) indicated by 1 bit, may be performed in accordance with a truth value (Boolean: true or false), or may be performed by a comparison of numerical values (e.g., a comparison with a predetermined value).

Each of the aspects and embodiments described herein may be used alone, may be used in combination, or may be switched in association with execution.

The information, signals, and the like described herein may be indicated by using any one of a variety of different technologies. For example, data, instructions, commands, information, signals, bits, symbols, chips and the like which may be mentioned throughout the entire description above may be indicated by voltages, currents, electromagnetic waves, magnetic fields or magnetic particles, optical fields or photons, or freely selected combinations thereof.

The terms "system" and "network" used herein are interchangeably used. The information and the like described herein may be indicated by absolute values, may be indicated by relative values with respect to predetermined values, or may be indicated by corresponding other types of information.

The above described information processing apparatus 10 is a computer. Those skilled in the art may call the computer a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or other appropriate terms.

The term "connected" or any variation thereof refers to any direct or indirect connection or coupling between two or more elements and may include the presence of one or more intermediate elements between two elements that are "connected" to each other. The coupling or connection between elements may be physical, logical, or combination thereof. When the term is used herein, two elements may be considered to be "connected" to each other by using one or more electric wires, cables and/or a printed electrical connection and by using electromagnetic energy such as electromagnetic energy having a wavelength in a radio frequency domain, a microwave region, and a light (both visible and invisible) region as some non-limiting and non-exhaustive examples.

Although the storage device 130 refers to a recording circuit, such as a ROM and a RAM in the above described embodiment, etc., they may be a flexible disk, a magneto-optical disk (e.g., a compact disk, a digital versatile disk, or a Blu-ray (registered trademark) disk), a smart card, a flash memory device (e.g., a card, a stick, or a key drive), a compact disc-ROM (CD-ROM), a register, a removable disk, a hard disk, a floppy (registered trademark) disk, a magnetic strip, a database, a server, or other proper storage media. The program may be transmitted through a telecommunication circuit.

In this description, when articles such as "a", "an" and "the" in English are added by translation, these articles includes a plurality thereof, unless clearly indicated that this is not so from context.

It is apparent to those skilled in the art that the present invention is not limited to the embodiments described herein. The present invention may be implemented as a modified or changed aspect without departing from the spirit and scope of the present invention provided based on the recitation in the claims. Therefore, the description herein is given for the purpose of exemplary explanation and does not have any limiting meaning for the present invention. Aspects selected from the aspects exemplarily described herein may be combined.

DESCRIPTION OF REFERENCE SIGNS

1 . . . system, 10 . . . information processing apparatus, 100*a*, 100*b* . . . central computing device, 130 . . . storage device, 142 . . . image capturing apparatus, 144 . . . display apparatus, 150 . . . operation controller, 151 . . . first detector, 152 . . . second detector, 153 . . . third detector, 154 . . . display controller, 160 . . . database.

The invention claimed is:

1. An information processing apparatus comprising:
a first detector configured to detect a real object based on captured image information generated by an image capturing apparatus;
a second detector configured to, in response to the real object being detected by the first detector, detect a user operation performed on the real object, the user operation involving a change in a state of the real object;
a display controller configured to, in response to the user operation being detected by the second detector, generate an application image that is associated with the real object and the user operation, to display the generated application image on a display apparatus, wherein the application image is displayed by executing an application program;
a third detector configured to detect an action made to the application image by a user; and
an operation controller configured to change an initial state of the application image based on the action detected by the third detector.

2. The information processing apparatus according to claim 1, wherein the operation controller is configured to set the initial state of the application image based on a tendency of initial states of the application image selected by the user.

3. The information processing apparatus according to claim 2, wherein the operation controller is configured to set, as the initial state of the application image, an initial state that is highest in number among the initial states included in the history.

4. The information processing apparatus according to claim 2, wherein the operation controller is configured to set the most recent initial state among the initial states included in the history as the initial state of the application image.

5. The information processing apparatus according to claim 2, wherein the operation controller is configured to set, as the initial state of the application image, an initial state of the application image identified by inputting an attribute of the user who has carried out the user operation in a trained model that has learned relationships between attributes of users and initial states of the application image.

6. The information processing apparatus according to claim 1, wherein when the application image is displayed on the display apparatus by the display controller, the third detector is configured to detect the action on the application image based on a result of subtracting, from the captured image information, information of the application image displayed on the display apparatus.

7. The information processing apparatus according to claim 1, wherein the application image is displayed at a location that is close to the real object and that does not overlap with the real object in a plan view.

8. The information processing apparatus according to claim 1, wherein the application image is projected onto a surface on which the real object is placed.

9. An information processing apparatus comprising:
a first detector configured to detect an object based on captured image information generated by an image capturing apparatus;
a second detector configured to, in response to the object being detected by the first detector, detect a user operation carried out with regard to the object, the user operation involving a change in a state of the object;
a display controller configured to, in response to the user operation being detected by the second detector, generate an image that is associated with the object and the user operation, to display the generated image on a display apparatus;
a third detector configured to detect an action on the image by a user; and
an operation controller configured to change an initial state of the image based on the action detected by the third detector, wherein the operation controller is configured to set, as the initial state of the image, an initial state that is highest in number among the initial states included in the history.

10. An information processing apparatus comprising:
a first detector configured to detect an object based on captured image information generated by an image capturing apparatus;
a second detector configured to, in response to the object being detected by the first detector, detect a user operation carried out with regard to the object, the user operation involving a change in a state of the object;
a display controller configured to, in response to the user operation being detected by the second detector, generate an image that is associated with the object and the user operation, to display the generated image on a display apparatus;
a third detector configured to detect an action on the image by a user; and
an operation controller configured to change an initial state of the image based on the action detected by the third detector,
wherein the operation controller is configured to set the most recent initial state among the initial states included in the history as the initial state of the image.

* * * * *